Dec. 22, 1931.  J. K. DIAMOND  1,837,210

BELT LACING

Filed June 23, 1931

INVENTOR
James K. Diamond
BY
Chappell & Earl
ATTORNEYS

Patented Dec. 22, 1931

1,837,210

UNITED STATES PATENT OFFICE

JAMES K. DIAMOND, OF GRAND RAPIDS, MICHIGAN, ASSIGNOR TO CLIPPER BELT LACER COMPANY, OF GRAND RAPIDS, MICHIGAN, A CORPORATION OF MICHIGAN

BELT LACING

Application filed June 23, 1931. Serial No. 546,312.

The objects of the invention are:

First, to provide an improved belt lacing.

Second, to provide a belt lacing wherein the coacting pin members are adapted to rock in engagement through a considerable arc.

Third, to provide a belt lacing with improved means for removably retaining the pin members in place.

Fourth, to provide a belt lacing wherein the maximum rocking arc of the pin members is utilized.

Objects relating to details and economies of my invention will appear from the description to follow. The invention is defined and pointed out in the claims.

A structure which is a preferred embodiment of my invention is illustrated in the accompanying drawings, in which.

Figure 1:
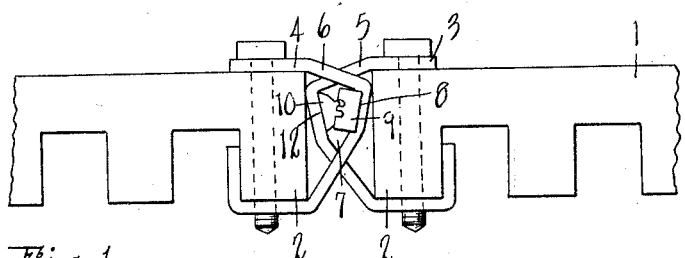
Fig. 1 is a fragmentary view in side elevation of a belt embodying my improved lacing.

In the accompanying drawings there is illustrated a belt 1 having the ends 2 thereof provided with coacting coupling members 3 and 4. The coupling members are provided with outwardly extending coacting bail-like loops 5 and 6 which overlap each other so as to provide an alined opening 7 therebetween for the reception of a coupling pin 8 comprising a coupling pin member 9 and a coupling pin member 10. The bail-like loops are provided with flat inwardly facing and downwardly inclined bights 11 and 12 which constitute seats for the coupling pin members 9 and 10.

The coupling pin member 9 is provided with a substantially flat face 13 having spaced longitudinal grooves 14 therein which are adapted to receive the tongues 15 which are provided on the curved face 16 of the other coupling pin member 10. The grooves and tongues are arranged so that the pin members 9 and 10 are free to rock with the loops 6 as the ends of the belt are flexed with respect to each other as illustrated by Fig. 2.

The coupling pin member 9 is also provided with end flanges 17 which extend over the ends of the end loops 6 of the coupling member 4 and end flanges 18 which extend over the ends of the coupling pin member 10.

In assembling the lacing, the loops 6 are arranged in overlapping relation and the assembled pin members 11 and 12 are then slid into position on their respective seats in the loops. The tension between the ends 2 of the belt 1 then draws the pin members together and causes the end flanges of the pin member 9 to coact with the end loops of the coupling member 4 and the ends of the pin member 11 so as to hold the pin members assembled and in proper position relative to the coupling members. The coupling pin members may be removed from the coupling members and the ends of the belt disconnected by releasing the tension between the coupling members and then removing the pin members.

Figure 2:
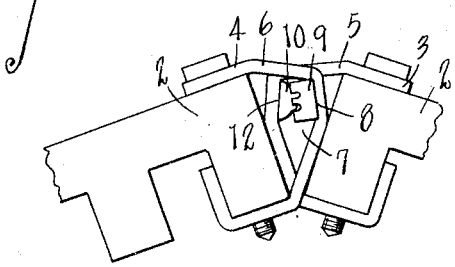
Fig. 2 is a view similar to Fig. 1 showing the lacing flexed.
Figure 3:
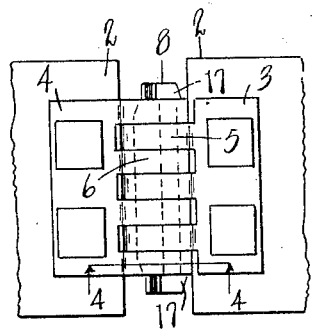
Fig. 3 is a fragmentary top plan of Fig. 1.
Figure 5:
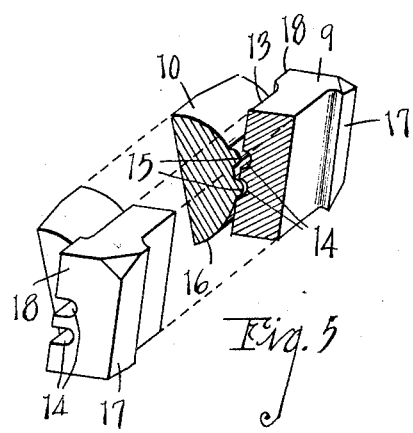
Fig. 5 is a perspective view of the coupling pin members having portions broken away.
Figure 4:
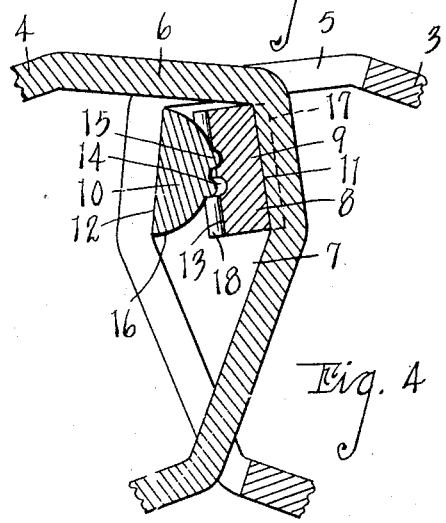
Fig. 4 is an enlarged section taken on line 4—4 of Fig. 3.
Figure 6:
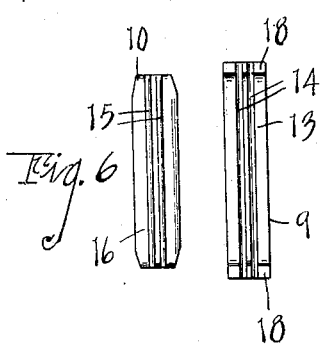
Fig. 6 illustrates the coupling pin members disassembled.

The seats which carry the coupling pin members are downwardly and inwardly inclined, as indicated by Fig. 1, so that the coupling pin members occupy an initial position at one extremity of their rocking arc so that when the ends of the belt are flexed as indicated by Fig. 2, the pin members are enabled to rock through their entire rocking arc. The rocking arc of the pin members is of course limited by the rocking arc of the coupling members.

Fig. 2 illustrates the ends of the belt in their extreme flexed position. When arranged in this manner, the rocking arc of the pin members is not only considerable but it is also sufficient to take care of the minimum rocking arc of the coupling members.

The plurality of coacting grooves and tongues in the pin members enables the pin members to be effectively engaged throughout their entire rocking cycle and slippage is effectively prevented even though the movement is considerable.

Inasmuch as one of the faces is flat and the other face is curved, practically all friction is eliminated between the coacting faces of the pin members. This results in the easy and frictionless flexing of the coupling members at the ends of the belt.

The coupling members 4 and 5 are secured to the ends of the belt in a conventional manner by rivets 19.

While I have illustrated and described my invention as being particularly applicable to a continuous belt, it is to be understood that it is equally applicable to link belts and the like.

For matter disclosed but not claimed in the present application, reference should be made to my co-pending application for Belt coupling, filed January 19, 1931, Serial No. 509,589.

The preferred embodiment of the invention illustrated and described may be modified in various ways without departing from the scope of the following claims.

Having thus described my invention, what I claim as new and desire to secure by Letters Patent is:

1. In a belt lacing, the combination of a pair of coacting coupling members having oppositely facing interfitting loops provided with opposed inclined flat bights constituting coupling pin seats, a coupling pin disposed in said seats comprising a pair of coupling pin members, one of said pin members having opposed end flanges which engage the ends of one of said coupling members and the ends of said other pin member whereby the pin members are retained against longitudinal movement in said coupling members, and one of said pin members having a flat face provided with a plurality of longitudinal grooves, the other of said pin members having a curved face provided with longitudinal tongues coacting with said grooves whereby said pin members are free to rock with respect to each other through a considerable arc, the inclination of said pin seats positioning said pin members so that they occupy the initial extremity of their rocking arc, whereby the maximum rocking arc is provided for them in service.

2. In a belt lacing, the combination of a pair of coacting coupling members having oppositely facing interfitting loops provided with opposed inclined flat bights constituting coupling pin seats, a coupling pin disposed in said seats comprising a pair of coupling pin members, one of said pin members having opposed end flanges which engage the ends of one of said coupling members and the ends of said other pin member, whereby the pin members are retained against longitudinal movement in said coupling members, and one of said pin members having a flat face provided with a plurality of longitudinal grooves, the other of said pin members having a curved face provided with longitudinal tongues coacting with said grooves whereby said pin members are free to rock with respect to each other through a considerable arc.

3. In a belt lacing, the combination of a pair of coacting coupling members having oppositely facing interfitting loops provided with opposed inclined flat bights constituting coupling pin seats, a coupling pin disposed in said seats comprising a pair of coupling pin members, one of said pin members having opposed end flanges which engage the ends of one of said coupling members and the ends of said other pin member, whereby the pin members are retained against longitudinal movement in said coupling members.

4. In a belt lacing, the combination of a pair of coacting coupling members having interfitting loops provided with flat inwardly facing bights constituting coupling pin seats, said seats being inclined relative to each other, and a coupling pin disposed in supporting engagement with said coupling members comprising a pair of coupling pin members, said pin members being disposed in said seats and having coacting flat and curved faces provided with a plurality of tongues and grooves, one of said pin members having end flanges engaging the ends of one of said coupling members and the ends of said other pin member, whereby to prevent said pin from slipping longitudinally in said coupling members.

5. In a belt lacing, the combination of a pair of coacting coupling members having interfitting loops provided with flat inwardly facing bights constituting coupling pin seats, said seats being inclined relative to each other, and a coupling pin disposed in supporting engagement with said coupling members comprising a pair of coupling pin members, said pin members being disposed in said seats and having coacting flat and curved faces provided with a plurality of tongues and grooves.

6. In a belt lacing, the combination of a pair of coacting coupling loops and having oppositely inclined coupling pin seats, and a coupling pin comprising a pair of coacting members in supporting engagement with the oppositely inclined coupling pin seats of said coupling loops to swing therewith, said coupling pin members having rocking engagement and provided with co-engaging integral parts, whereby lateral and longitudinal sliding movement is prevented, said inclined seats giving said pin members an initial position which permits the maximum rocking of the pin members in one direction from said initial position.

7. A belt lacing comprising a plurality of coacting coupling loops having opposed coupling pin seats, and a coupling pin comprising coacting pin members disposed in said seats, one of said pin members having integral end flanges adapted to extend over the ends of one of said coupling members and said other pin member, whereby said pin members are retained in assembled relation in said coupling members by the tension between said coupling members, the relative sizes of said flanges and coupling loops being such that said coupling pin members are longitudinally removable by releasing said tension.

8. A belt lacing comprising a plurality of coacting coupling loops having opposed coupling pin seats, and a coupling pin comprising coacting pin members disposed in said seats, said pin members having a plurality of coacting longitudinal grooves and tongues which permit them to rock through a considerable arc with said loops.

In witness whereof I have hereunto set my hand.

JAMES K. DIAMOND.